United States Patent
Hsu et al.

(10) Patent No.: US 9,052,812 B1
(45) Date of Patent: *Jun. 9, 2015

(54) SYSTEM FOR EXPORTABLE GRAPHICAL DESIGNS WITH INTERACTIVE LINKED COMMENTS BETWEEN DESIGN AND PLAYBACK ENVIRONMENTS

(71) Applicant: Axure Software Solutions, Inc., San Diego, CA (US)

(72) Inventors: Victor Hsu, San Diego, CA (US); Martin Smith, San Diego, CA (US); Samir Hashem, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,022

(22) Filed: Dec. 8, 2014

Related U.S. Application Data

(63) Continuation of application No. 14/201,161, filed on Mar. 7, 2014, now Pat. No. 8,938,679.

(60) Provisional application No. 61/905,846, filed on Nov. 18, 2013.

(51) Int. Cl.
  *G06F 17/24* (2006.01)
  *G06F 3/00* (2006.01)
  *G06F 3/048* (2013.01)
  *G06F 3/0486* (2013.01)
  (Continued)

(52) U.S. Cl.
  CPC .......... *G06F 3/0486* (2013.01); *G06F 3/04817* (2013.01); *G06F 17/241* (2013.01); *G06F 3/04855* (2013.01)

(58) Field of Classification Search
  CPC ..... G06F 17/241; G06F 3/048; G06F 3/0481; G06F 3/04817; G06F 3/04855
  See application file for complete search history.

(56) References Cited

U.S. PATENT DOCUMENTS

| | | | |
|---|---|---|---|
| 6,247,032 B1 | 6/2001 | Bernardo et al. | |
| 6,571,295 B1 | 5/2003 | Sidana | |
| 6,601,233 B1 * | 7/2003 | Underwood | 717/102 |

(Continued)

OTHER PUBLICATIONS

Allow multiple users to have a conversation thread on the same Comment, Community Powered Support, iRise, Accessed on Feb. 6, 2014, https://community.irise.com/irise/topics/allow_multiple_users_to_have_a_conversation_thread_on_the_same_comment.

(Continued)

*Primary Examiner* — James T Durkin
(74) *Attorney, Agent, or Firm* — The Mueller Law Office, P.C.

(57) ABSTRACT

Various methods and systems for collaborating on the specification of an interactive graphical design are provided. An exemplary system comprises a graphical design environment. The system also comprises a note interface in the graphical design environment that displays a note field for accepting a text string from the user. The system also comprises a design player that renders the design. The system also comprises a discussion interface that: (i) is displayed in the design player consistently with the design; (ii) displays the text string from the user as a note; and (iii) accepts a comment from a second user regarding the note. The system also comprises a data store accessible to the graphical design environment and the design player. The comment is displayed in the graphical design environment after being accepted in the discussion interface.

30 Claims, 7 Drawing Sheets

(51) Int. Cl.
*G06F 3/0481* (2013.01)
*G06F 3/0485* (2013.01)

(56) References Cited

U.S. PATENT DOCUMENTS

| | | | |
|---|---|---|---|
| 6,725,227 B1 | 4/2004 | Li | |
| 6,762,777 B2 | 7/2004 | Carroll | |
| 7,123,970 B1 | 10/2006 | Stroomer | |
| 7,174,286 B2 | 2/2007 | Martin et al. | |
| 7,349,837 B2 | 3/2008 | Martin et al. | |
| 7,415,697 B1 | 8/2008 | Houlding | |
| 7,496,856 B2 | 2/2009 | Beezer et al. | |
| 7,584,268 B2 | 9/2009 | Kraus et al. | |
| 7,788,647 B2 | 8/2010 | Martin et al. | |
| 7,818,194 B2 | 10/2010 | Yoshida et al. | |
| 7,861,158 B2 | 12/2010 | Martin et al. | |
| 7,962,853 B2 | 6/2011 | Bedi et al. | |
| 7,975,222 B1* | 7/2011 | Chegini et al. | 715/249 |
| 8,095,528 B2 | 1/2012 | Rakowski et al. | |
| 8,108,779 B1 | 1/2012 | Rein et al. | |
| 8,373,741 B2 | 2/2013 | Roberts et al. | |
| 8,402,392 B2 | 3/2013 | Look et al. | |
| 8,504,915 B2 | 8/2013 | Simmons et al. | |
| 8,510,646 B1 | 8/2013 | Young et al. | |
| 8,560,946 B2 | 10/2013 | Fugitt et al. | |
| 8,938,679 B1* | 1/2015 | Hsu et al. | 715/751 |
| 8,990,150 B2* | 3/2015 | Bailor et al. | 707/608 |
| 8,996,985 B1* | 3/2015 | Johnston et al. | 715/230 |
| 2002/0049786 A1 | 4/2002 | Bibliowicz et al. | |
| 2002/0138582 A1 | 9/2002 | Chandra et al. | |
| 2003/0081000 A1 | 5/2003 | Watanabe et al. | |
| 2003/0115167 A1 | 6/2003 | Sharif et al. | |
| 2003/0163519 A1 | 8/2003 | Kegel et al. | |
| 2003/0177018 A1 | 9/2003 | Hughes | |
| 2003/0208743 A1* | 11/2003 | Chong et al. | 717/106 |
| 2004/0205541 A1 | 10/2004 | D'Amico | |
| 2005/0138110 A1* | 6/2005 | Redlich et al. | 709/201 |
| 2005/0289452 A1* | 12/2005 | Kashi et al. | 715/512 |
| 2006/0031773 A1 | 2/2006 | Uchida | |
| 2006/0101328 A1* | 5/2006 | Albornoz et al. | 715/512 |
| 2006/0282762 A1* | 12/2006 | Diamond et al. | 715/511 |
| 2007/0118794 A1 | 5/2007 | Hollander et al. | |
| 2007/0168931 A1 | 7/2007 | Martin et al. | |
| 2008/0119235 A1* | 5/2008 | Nielsen et al. | 455/566 |
| 2009/0031401 A1 | 1/2009 | Cudich et al. | |
| 2009/0199082 A1 | 8/2009 | Hollander et al. | |
| 2010/0070845 A1 | 3/2010 | Facemire et al. | |
| 2010/0115393 A1 | 5/2010 | Albornoz et al. | |
| 2010/0325557 A1* | 12/2010 | Sibillo | 715/751 |
| 2011/0276914 A1 | 11/2011 | Ahlgren et al. | |
| 2012/0030553 A1 | 2/2012 | Delpha et al. | |
| 2012/0174002 A1 | 7/2012 | Martin et al. | |
| 2012/0297315 A1 | 11/2012 | Lesh | |
| 2013/0031455 A1 | 1/2013 | Griffiths et al. | |
| 2013/0097481 A1* | 4/2013 | Kotler et al. | 715/230 |
| 2013/0132814 A1* | 5/2013 | Mangini et al. | 715/230 |
| 2014/0006919 A1* | 1/2014 | He | 715/230 |
| 2014/0068410 A1* | 3/2014 | Dolinina | 715/234 |
| 2014/0164994 A1* | 6/2014 | Myslinski | 715/808 |
| 2014/0337760 A1* | 11/2014 | Heinrich et al. | 715/753 |

OTHER PUBLICATIONS

An Interview With Support, iRise, Oct. 29, 2013, Accessed on Feb. 6, 2014, http://www.irise.com/blog/2013/10/29/an-interview-with-support/.
Annotator, Annotatelt, Accessed on Feb. 17, 2014, http://annotatorjs.org/.
Examples, Notable, Accessed Feb. 17, 2014, http://www.notableapp.com/example_uses.
Feedback, Notable, Jun. 12, 2012, Accessed on Feb. 17, 2014, https://www.notableapp.com/posts/ecce66acca8536d81a619b74d0de91f8d503f175.
General FAQs, Notable, Accessed on Feb. 17, 2014, http://forum.notableapp.com/support/general#how-to-annotate-screenshot.
Home page, Annotatelt, Accessed on Feb. 17, 2014, http://annotateit.org/.
Home page, Bounce, Accessed on Feb. 17, 2014, http://www.bounceapp.com/about.
Home page, Diigo, Accessed on Feb. 17, 2014, https://www.diigo.com/.
Home page, InVision, Accessed on Feb. 17, 2014, http://www.invisionapp.com/.
Home page, Notable, Accessed on Feb. 17, 2014, http://www.notableapp.com/bounce.
iDoc: Threaded Comments, Support Center, iRise, Last updated Jul. 19, 2013, Accessed on Feb. 6, 2014, http://support.irise.com/customer/portal/articles/1230148-idoc-threaded-comments.
iRise 9 Release Notes, iRise, Accessed on Feb. 6, 2014, http://support.irise.com/customer/portal/articles/578982-irise-release-notes.
iRise 9: Enhanced Review Features in the New iRise Reader, The Official iRise Blog, iRise, Access On: Feb. 6, 2014, http://www.irise.com/blog/2013/11/18/irise-9-enhanced-review-features-in-the-new-irise-reader/.
iRise Release Notes, Support Center, iRise, Last Updated Jan. 24, 2014, Accessed on Feb. 6, 2014, http:// support.irise.com/customer/portal/articles/578982-irise-release-notes.
New Features, InVision, Jan. 21, 2014, Accessed on Feb. 17, 2014, http://www.invisionapp.com/new-features.
The Annotator Demo, Annotator, Annotatelt, Accessed on Feb. 17, 2014, http://annotatorjs.org/demo/.
Tour, InVision, Accessed on Feb. 17, 2014, http://www.invisionapp.com/tour.
Tour, Notable, Accessed on Feb. 17, 2014, http://www.notableapp.com/tour.
Nonfinal Office Action dated Jun. 13, 2014 for U.S. Appl. No. 14/201,161.
Final Office Action dated Oct. 1, 2014 for U.S. Appl. No. 14/201,161.
Notice of Allowance and Fees dated Dec. 10, 2014 for U.S. Appl. No. 14/201,161.

* cited by examiner

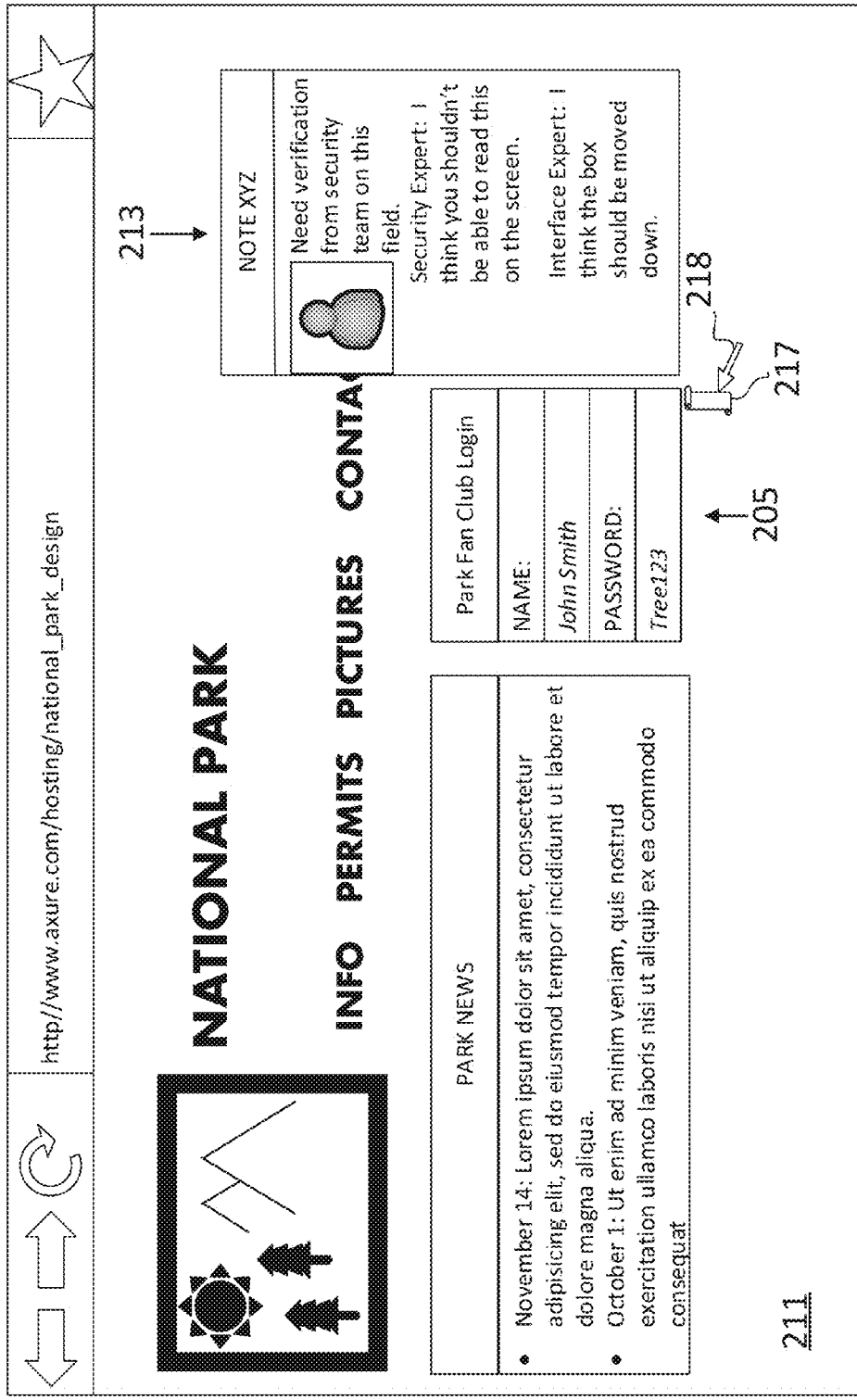

300

SYSTEM FOR EXPORTABLE GRAPHICAL DESIGNS WITH INTERACTIVE LINKED COMMENTS BETWEEN DESIGN AND PLAYBACK ENVIRONMENTS

CROSS-REFERENCE TO RELATED APPLICATIONS

This application is a continuation of U.S. patent application Ser. No. 14/201,161, filed Mar. 7, 2014, which claims the benefit of U.S. Provisional Application No. 61/905,846, filed Nov. 18, 2013, which are both incorporated by reference herein in their entirety.

BACKGROUND OF THE INVENTION

Complex interactive graphical designs require collaboration among numerous professionals with wide ranging skill sets. As the complexity of these designs increase, the number of stakeholders involved in the design increases along with the level of specialization they each exhibit. It is therefore of increasing importance for design tools to facilitate a liquid and frictionless flow of information between each member of the collaborative team so that each stakeholder can apply their skills to the design process while the team remains focused on a common understanding of what the final design will be.

Along with diverging specialties, teams expect to be provided with an environment for fluid collaboration even when the team members are located in diverse geographical locations. Design tools currently approach this problem by providing stakeholders with the ability to add notes to a design for later review by other members of the team. For example, a project manager can instruct a graphical design professional on the team to modify the appearance of an image they produced while a graphical designer can instruct an interface specialist to make the image appear in a light box when a button in the design is selected. The graphical designer and interface specialist could then each enter the design at a later time, read the content of the notes, and edit the design as instructed.

Design tools have previously facilitated collaboration through various approaches. Simple graphical designs tools, such as those used for producing text documents, can allow for collaboration through the introduction of comments and specialized notation systems for tracking changes. More complex design tools, such as those used to edit the design of a web site, allow for collaboration through the use of a comment pane that can appear along the side of a web page as it is being rendered in a browser. The comment pane allows multiple users to communicate textually regarding the design. For example, one user may view the design and add a comment on one aspect of the design which is then read by a second user.

An example of a collaborative tool for commenting on an interactive graphical design in the specific context of a website design can be described with reference to web browser screen 100 in FIG. 1. The web browser illustrated in FIG. 1 is serving as a player to provide a rendering of the design in design interaction interface 101. This particular browser includes a note interface 102 with a note display interface 103 and an add note interface 104. In this tool, a particular stakeholder in the design is able to add "pins" to the design such as pin 105 by clicking on button 106 in the add note interface 104. The stakeholder can then click on a portion of the page to add the pin to the rendering of the design and then enter a note in note display interface 103 that is associated with the pin. In the illustrated example, a security expert stakeholder has added a pin to the design in order to express her interest in modifying the password field so the password does not show up as the user enters it. Another stakeholder in the design, for example a software developer, can view the comment provided by the security expert and act on the comment at a later time. In this manner, an environment for collaborative design efforts between the stakeholders is provided.

SUMMARY OF INVENTION

In one embodiment, a system comprises a graphical design environment that provides a drag and drop interface to a user. The user can add a widget to a design using the drag and drop interface. The system also comprises a note interface in the graphical design environment that displays a note field for accepting a text string from the user. The system also comprises a design player that renders the design. The system also comprises a discussion interface that: (i) is displayed in the design player consistently with the design; (ii) displays the text string from the user as a note; and (iii) accepts a comment from a second user regarding the note. The system also comprises a data store accessible to the graphical design environment and the design player. The comment is displayed in the graphical design environment after being accepted in the discussion interface. The comment and a second comment are delivered to the user via email after the comment is accepted in the discussion interface. The text string is stored in the data store, and is restricted such that it can only be edited by a predetermined set of users.

In another embodiment, a system comprises a graphical design environment that provides a drag and drop interface to a user. The user can add a widget to a design using the drag and drop interface. The system also comprises a note interface in the graphical design environment that displays a note field for accepting a text string from the user. The system also comprises a design player that renders the design. The system also comprises a discussion interface that: (i) is displayed in the design player consistently with the design; (ii) displays the text string from the user as a note; and (iii) accepts a comment regarding the note from a second user. The system also comprises a data store accessible to the graphical design environment and the design player. The system also comprises a scrollbar for the discussion interface. The scrollbar allows the second user to scroll through a set of notes that are associated with the design while viewing a fixed portion of the design. The set of notes includes the note. The comment is displayed in the graphical design environment after being accepted in the discussion interface. The comment is delivered to the user via email after being accepted in the discussion interface. The text string is stored in the data store.

In another embodiment, a computer-implemented method comprises generating a graphical design environment for a user. The graphical design environment enables the user to specify a design and add a widget to the design. The method also comprises receiving a text string from the user via the design environment. The text string is stored as a note in a data store. The method also comprises generating an instantiation of the design for rendering in a design player as a rendered design. The rendered design includes the note. The method also comprises receiving a second text string from a second user via the design player. The second text string is stored as a comment on the note in the data store. The method also comprises displaying the comment in the graphical design environment after the comment is received in the design player in the receiving step. The method also comprises delivering the comment and a second comment to the user via email after the comment is received in the design player in the receiving step. The data store is accessible to both the design player and the graphical design environment. The text string is restricted such that it can only be edited by a predetermined set of users.

In additional embodiments, various methods and systems for collaborating on the specification of an interactive graphical design are provided. For example, messages can be sent to stakeholders in the design when comments or notes are added. As another example, the state of the design can be saved when a comment or note is added to the design and saved to facilitate collaboration at a later time. The state of the design can be saved in an abstracted form such as by saving an image of the design's state. The state of the design can also be saved in the form of executable code that can be used to render the state of the design in a player at a later time. Numerous additional embodiments for facilitating the collaborative specification of an interactive graphical design are provided in the detailed description below.

BRIEF DESCRIPTION OF THE DRAWINGS

FIG. 2a-d illustrate various instantiations of a design in a design environment and a player that can be used to describe the flow chart in FIG. 3.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
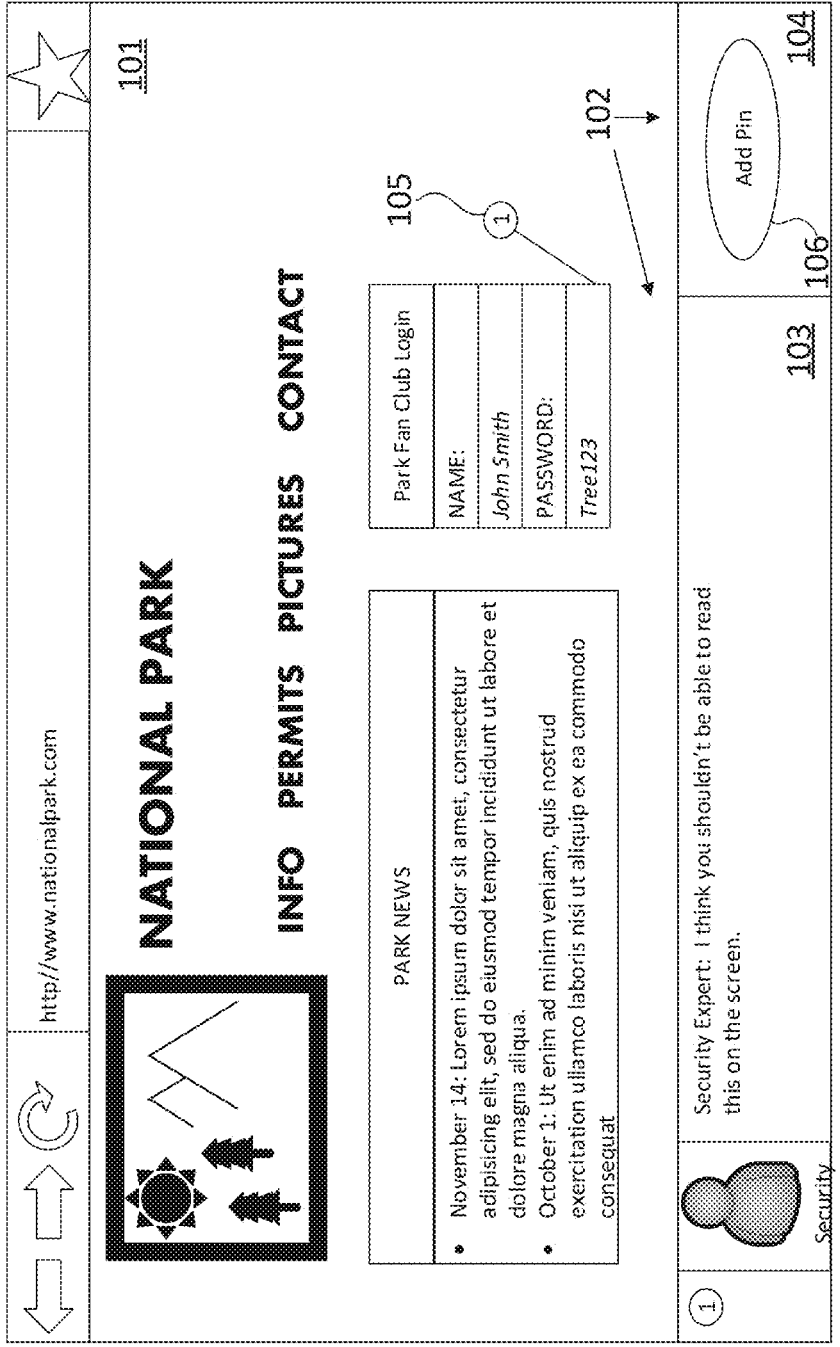
FIG. 1 illustrates a note interface for commenting on web pages that is in accordance with the related art.
Figure 2A:
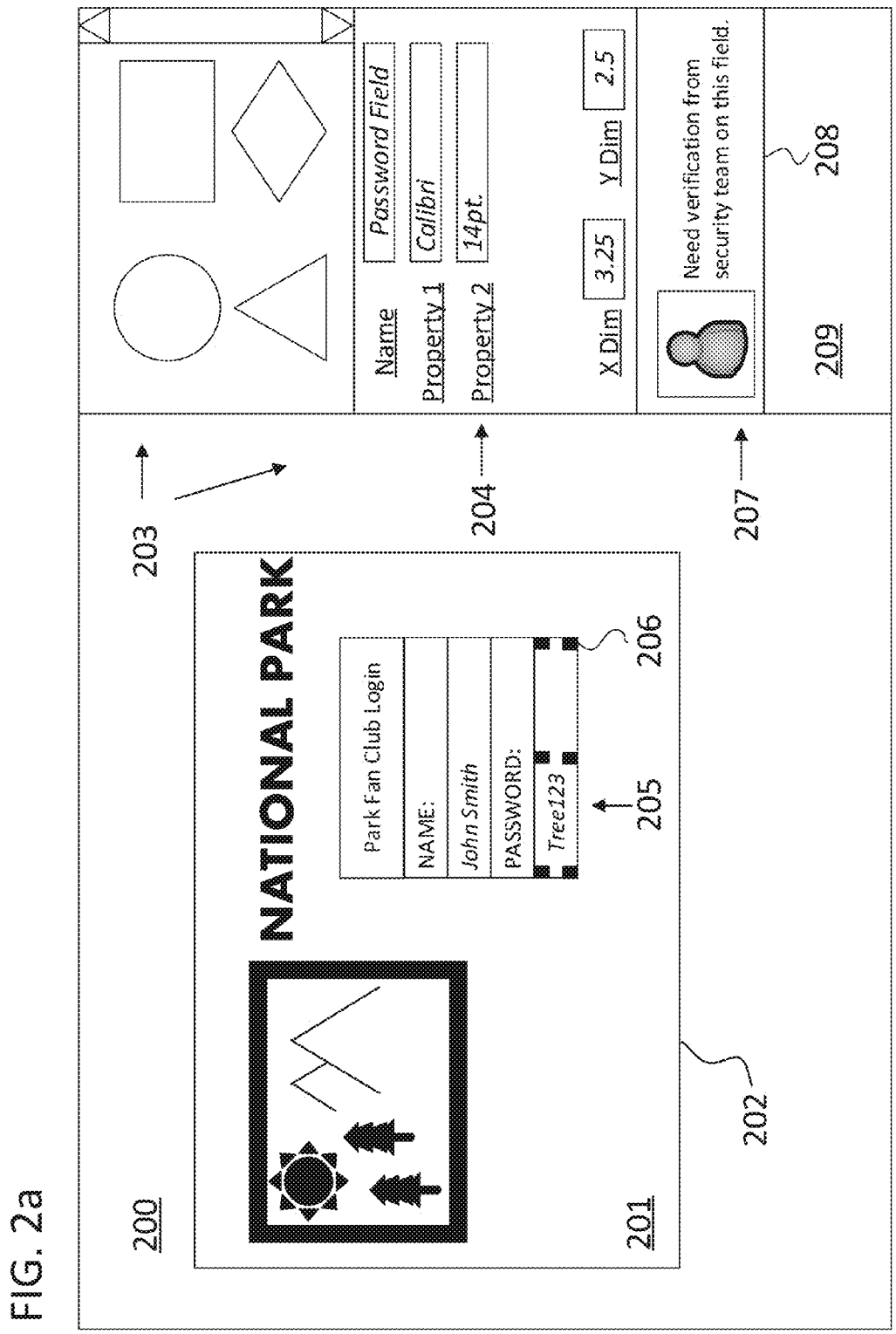
Figure 2B:
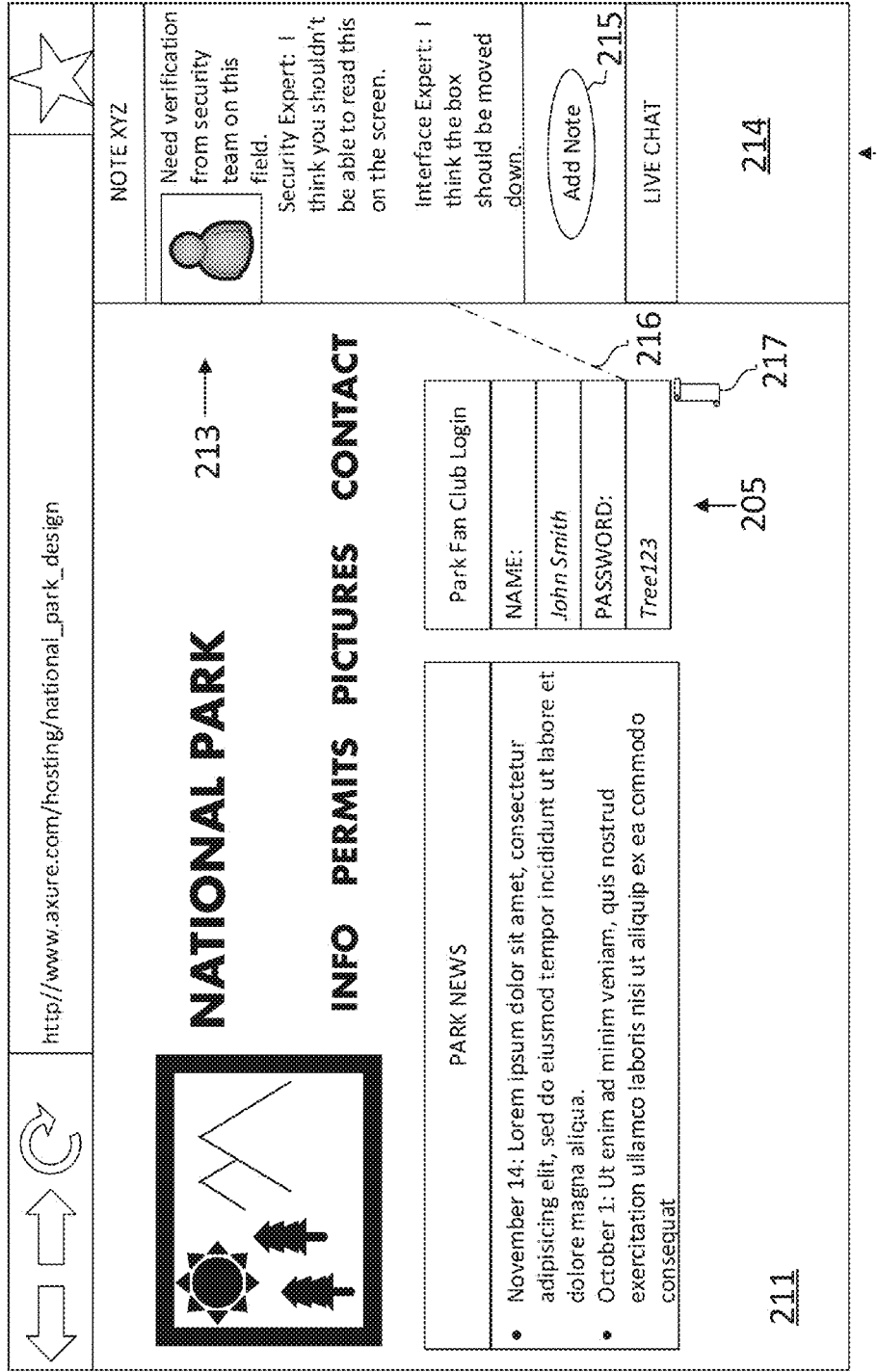
Figure 2D:
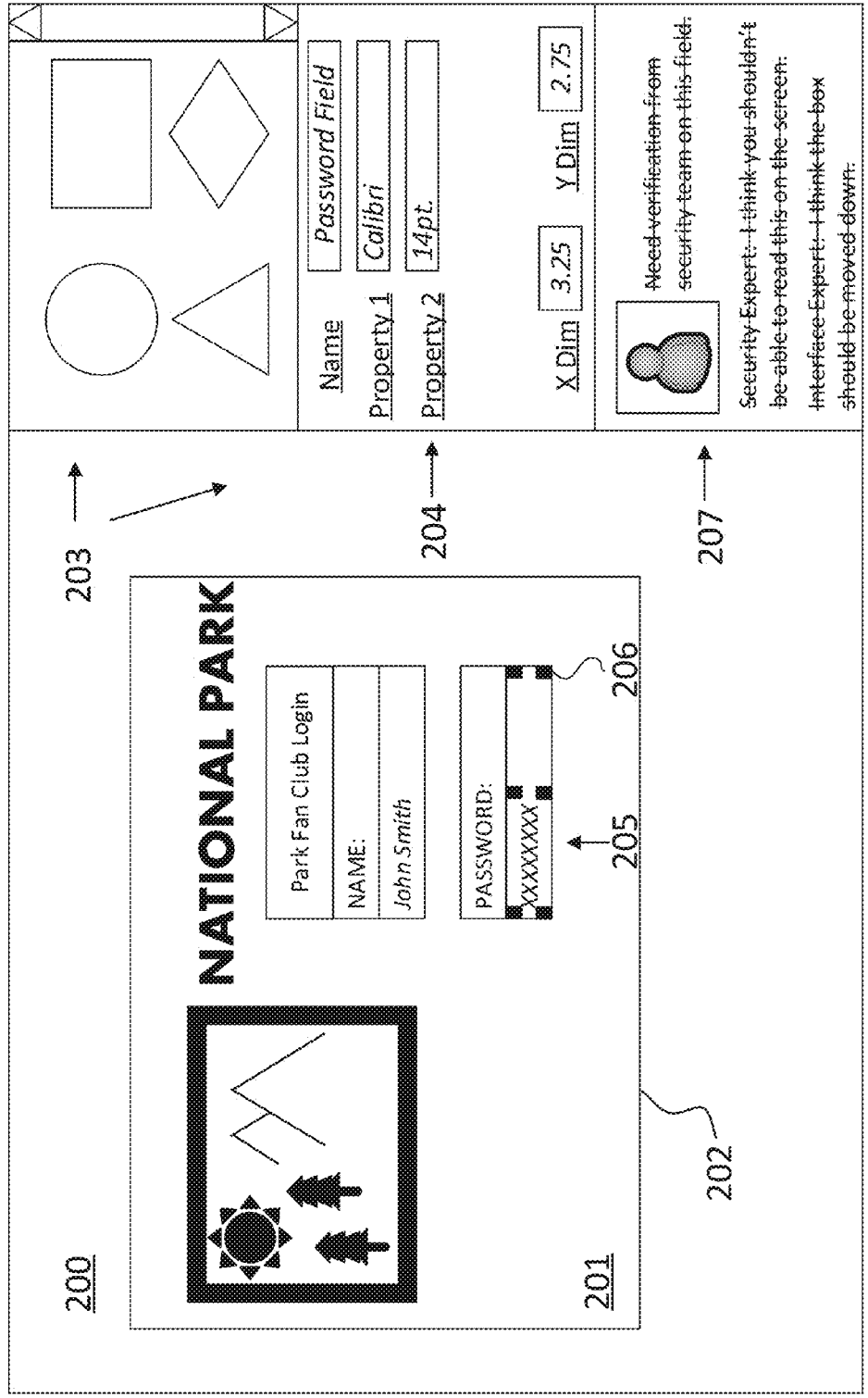
Figure 3:
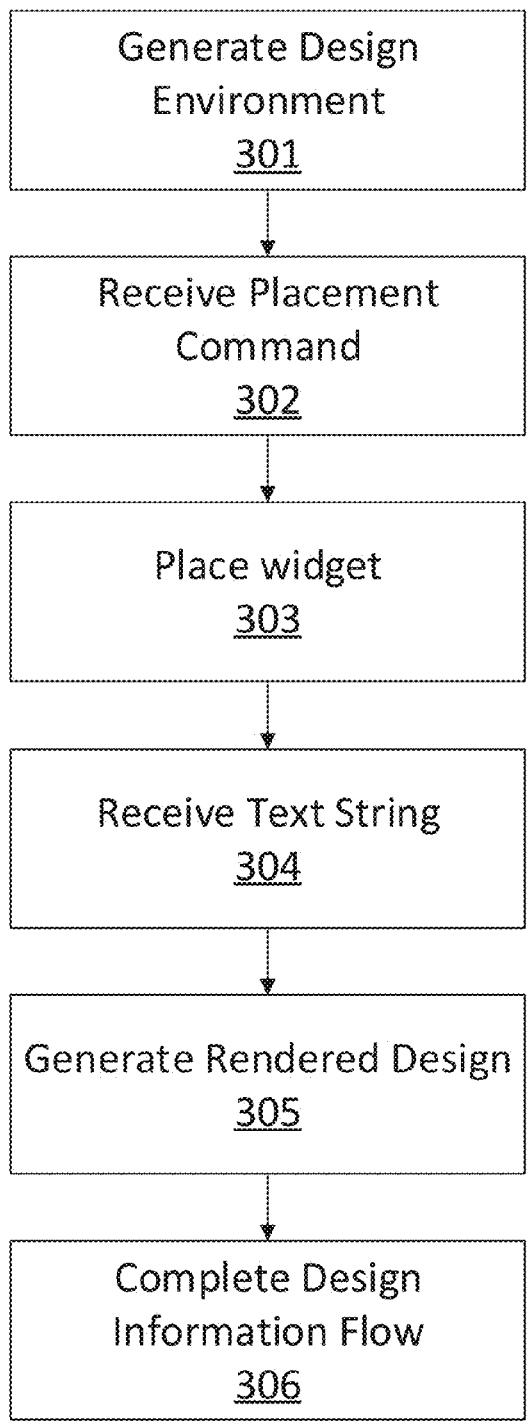
FIG. 3 illustrates a computer-implemented method for facilitating the addition of comments for the design of an interactive graphical design.

FIGS. 2a-d display a design environment 200 and a design player 210 that can be referred to when describing a set of computer-implemented methods that are in accordance with method 300 in FIG. 3. Method 300 begins with step 301 in which a design environment is provided for a user. The user can be a stakeholder of a graphical design such as a product manager, graphic designer, software developer, security expert, interface specialist, or design environment specialist. The design environment can be generated through the user of processing system 401 in FIG. 4 and one of the users can be user 403 in FIG. 4. The design environment allows a user to specify a graphical design and add widgets to the design.

In FIG. 2a, design environment 200 is show displaying a portion of design 201 in a design interface 202. A user can add widgets to design 201 by dragging and dropping widgets from widget specification interface 203 into design interface 202. The user can also add widgets to design interface 202 using short cut keys or a right mouse click and selection from a pop up menu. Such actions are in accordance with steps 302 and 303 in FIG. 3 in which a widget placement command is received from a user and a widget is placed in the design in response to that command.

Design environment 200 may display a widget specification interface in many different forms. For example, the widget specification interface could take up separate regions of design environment 200 or be limited to a single contiguous location. As another example, the widget specification interface could be displayed permanently as part of the design environment interface or could only be displayed in response to an input from the user to trigger the display of the widget specification interface in whole or in part. The widget specification interface could include a widget tool bar from which widgets could be selected and dragged into design interface 202. In the context of web design, the widget could be a button, a menu, a text field, a text box, a display window, a link, or any other design element for a web page.

Properties of individual widgets can be specified in widget property specification interface 204. As illustrated, the absolute position of the widget, the name of the widget, and two properties can be specified in widget property specification interface 204. The widget property specification interface can switch its contents in real time as a user selects different widgets in design interface 202. The widget that is currently selected can be offset visually from the other widgets in the design by surrounding the widget with a selection reticle or by altering the transparency or opacity of the selected widget relative to the other elements in the design. As illustrated, text field 205 is the currently selected widget which is shown by the selection reticle 206 and the fact that widget property specification interface 204 is populated with the values specified for the properties of text field 205. The widget property specification interface can also be linked to the selected widget via the display of numbered footnotes displayed on the widget and display in widget property specification interface 204.

Method 300 continues with step 304 in which a text string is received from a user for a notation field of a note linked to a widget. The text string can be received via routing system 404 in FIG. 4. The text string can be stored in memory 402 in a data structure in which the widget and the note have been linked. The link between the widget and the note can be created after the widget has been instantiated in memory 402 by receiving a command from the user to associate the widget with a note. However, the widget and note can also be simultaneously instantiated in memory 402 such that there is no need to associate the note and the widget. In situations in which notes can exist separately from widgets, the note could be associated with the design and not be associated with any of the particular widgets in the design.

In FIG. 2a, design environment 200 includes a note interface 207. In this example, note interface 207 is a part of widget specification interface 203. However, note interface 207 can occupy a separate portion of design environment 200. In large part, note interface 207 can exhibit the same display characteristic as widget specification interface 203 in that, for example, note interface 207 could only display notes associated with a currently selected widget. The note interface can also simultaneously display all notes associated with a design or a single page of the design. The note interface could have a scroll bar or other interface element for allowing a user to scan through the multiple notes that may be present in the interface.

As illustrated, note 208 is linked to text field 205 as indicated by selection reticle 206. Notes can be linked to widgets via other symbols such as an alpha numeric footnote that would appear in proximity to both the note and widget. For example, a footnote with the number 1 could appear in the corner of text field 205 and in note interface 207 near note 208. Notes can also be linked to widgets via lines drawn across design environment 200 from the note to the widget. The lines or symbols can appear as soon as text is entered into the note or once a return key or other input is received from the user to indicate completion of the text entry. The input could be the selection of any point in design environment 200 that is not in note interface 207. Such approaches would be best suited to situations where notes were inherent properties of widgets in the design environment such that widgets already had notes even before receiving an input from the user to associate them with a note.

In FIG. 2a the note interface includes a blank field 209 where a text string for an additional note can be added. A user can then enter a text string into the notation field to create a note. As notes are populated by inputs from users, additional blank fields can be provided for additional notes to be added. Numerous notes can be added to note interface 207 in this fashion. The note interface could also be limited to a set number of notation fields that can be filled with text strings received from users.

The notation fields can accept other kinds of inputs in addition to basic text strings. For example, the notation field can accept text strings with rich formatting. The notation fields could also accept hyperlinks and include automatic text editing features such as automatic spell check and the automatic instantiation of a hyperlink if text is entered that would indicate the text was likely a hyperlink. The notation field could also allow users to enter files for attachment. For example, the users could attach an image file representing the current state of the design when the note was edited. As another example, users could attach video files that illustrate how they envision the interactive features of the design to take place. As another example, users could attach files that include instructions for rendering a series of interactions in a player such as a web browser. The instructions could allow a user to "play" a rendering of an interactive session in which a hypothetical viewer interacted with the design in a particular manner. The design would then be rendered as if it were under the control of a viewer interfacing with the design in that particular manner. The user that was "playing" the rendering could then pause the playback and interact with the design from that point in the playback. As a result, the experience of the user would diverge from the experience of the hypothetical viewer from that point onward.

In FIG. 2a there is no prompt in blank field 209 to indicate what the contents of the note should be. As such, blank field 209 can serve as a receptacle for any statements regarding the design that a user wanted to enter to create a note. The note interface can also have prompts for text fields for particular kinds of notes to be added to design 201. For example, each note could include a note field for the priority of the widget in terms of how important the widget is for the overall design, a note field to indicate the stakeholder that is responsible for taking care of the widget in the design, a note field to indicate the benefit that will be provided by the widget, a note field to indicate the status of the widget in the overall project, a note field to provide a description of the widget, a note field to describe how the widget should be changed, and a note field to describe how the widget should appear and behave when finalized. The note interface can also have prompts for pull down menus for particular kinds of notes to be added to design 201. In these situations, the prompts will be for note entries that have a limited number of common responses that can be foreseen by the developer of the tool. For example, the prompt could be "Priority" and the pull down menu could include the following selections: "High," "Medium," "Low," and "Custom."

In FIG. 2a, note 208 includes an icon that indicates the identity of the user that added the note. The identity can be drawn from a database of user identities and can be accessed as soon as a user logs in to the design tool. Thereafter, design environment 200 would assign the identity of the logged in user to any note that was added during the current session. Users could also assign their identity to a note after the note was created by selecting their identity from a pull down menu or by typing their user name into a text field. The identifier for the note could include a text string representing the user, an image of the user, or any other symbol that could be used to distinguish the user from other stakeholders in the design process. The text string representing the user could be the user's name and could also include an indication of the class of stakeholder to which the user belongs. For example, the text string could be "John Smith" or "John Smith—Graphics."

Method 300 continues with step 305 in which an instantiation of the design is generated for rendering in a player as a rendered design. Generation step 305 could involve the creation of a coded representation of the design through an export process. The coded representation serves to effectively export the design from the design environment because the coded representation can exist and be rendered apart from the design environment. The coded representation could also be exported and saved to a memory and then later on be retrieved for rendering in a player. Generation step 305 could also involve the real time use of the code used to render the design in design environment 200 to serve a rendering of the design to the player from a web server. In this way, the design could be used to render an end user experience without generating an intermittent coded representation of the design. In situations where the design was exported and stored as an intermittent coded representation, the rendered design would not comprise widgets but would instead comprise coded representations of those widgets. However, in the remainder of the discussion the term "widget" will be used to encompass both widgets and coded representations of widgets when used in the context of a rendered design rather than a design in the tool. In any of these situations, the instantiation of the design that is rendered would include a note that was added while the design was being specified in the design environment.

In the context of the design of web pages, the player could be an external player such as a standard web browser and the instantiation of the design could be a markup and style sheet language description of the design. In this situation, the note could be included in the markup description of the design or it could be included in a script that was referenced by the markup description. The player could also be a reader that is part of the overall design tool such that the design environment 200 and the player were designed to access a common database from which the design tool could allow users to specify the design and from which the reader could allow viewers to view the design. The player could operate on a design with a proprietary format and be used specifically for playing designs from design environment 200. The player could also be a web browser with an add-on that is specifically designed to render notes created in design environment 200 such that the add-on was used to render the notes along-side the rendering of the design in the unmodified web browser.

In FIG. 2b, design 201 is rendered as rendered design 211 in design player 210. Note 208 from note interface 207 is displayed as note 213 in discussion interface 212. Discussion interface 212 allows viewers of the design to add notes to discuss the design. The discussion interface 212 can be displayed consistently with the rendered design, or it can appear in design player 210 when an icon is selected with a mouse click or upon entry of a display command using a different user interface. The discussion interface can also include a live chat interface 214 that can allow multiple viewers to discuss the design. Live chat interface 214 can exhibit many of the characteristics of standard instant messaging service that are currently available. The external player can include various features such as a video chat feature, the ability for viewers to share multiple documents, the ability for viewers to share their screens, and the ability for viewers to exchange which viewer is controlling the design.

Discussion interface 212 can also include a button 215 that can be selected to allow viewers to add additional notes to the design. When selected, button 215 can trigger the appearance of a pop up window allowing the viewer to enter a text string or attach files that will comprise the contents of the note. The note can then be generically linked to the design or it can be associated with a specific widget. The note can be associated with a widget by placing the rendered design 211 into a state where selection of a widget by a viewer indicates the user's intention to associate the note with the widget. The design can be placed in this state when the discussion interface 212 is first displayed, as soon as button 215 is selected, or when a separate interface element is selected in the pop up window. After selecting the interface element in the pop up window, the next click from the viewer could associate the note with the widget on which the user clicked. The pop up window could also have an indicator for finalizing the note such as a "Complete" or "Submit" button. If a viewer selected this button before associating the note with a widget, the note would be linked to the design in general and not be linked to any specific widget.

The discussion interface could also allow users to add comments to the notes. These comments could appear within the graphical space set off for the note and be indented or be in a smaller font to set them off from the original note. The comments could be added by selecting a button displayed in the note area or could be added any time a user selected the note and began inputting text. The identity of the viewer entering the comment could also be added to the note in order to keep track of who was adding information to the note. The identifiers for the viewers that entered the comments can mirror the identifiers for the stakeholders that entered the original note as described above. For example, the comments could be identified using a text string of the stakeholders name and may also include the class of stakeholder to which that particular stakeholder belongs.

The use of comments added to specific notes would exhibit certain benefits over requiring viewers to add additional notes to the design because comments relating to the same note are thereby collaboratively sorted with little effort on the part of the various stakeholders involved in the project. Multiple comments can be added to the note in order to facilitate multiple layers of collaborative effort directed to the widget in question. Also, comments can be added to comments to create comment threads which would be particularly useful for channeling and organizing multiple conversations regarding a widget. As illustrated, the comment added by the security expert was in direct response to the note provided by the designer from within the design environment while the comment added by the interface expert may trigger the next step in the design flow by suggesting an alternative modification to the widget. In this way, the comments added to a note can respond to the stakeholder that initiated the conversation through the creation of the note, and can also push the design process further by continuing the conversation.

Viewers do not need to be simultaneously viewing a design in order for these comments to be shared with all of the stakeholders in the design process. For example, the security expert on the team could have added their comment while viewing the design and the comment would appear in rendered design 211 the next time a viewer accessed the design for rending in the player. In the illustrated situation, the next viewer was an interface expert that was able to add a comment regarding additional modifications to the widget in the same conversation. The application of both comments to this note is beneficial because they are both modifications that might be made by the same stakeholder. If the interface expert had wanted to add information relating to a different aspect of the design, such as a question for the project manager regarding whether or not the password field should even be on the current page, the interface expert could have added an additional note by pressing button 215 to start an additional conversation.

Allowing stakeholders to view and add comments to notes in a player offers several benefits. First, with more complex designs, not every stakeholder may have the necessary tools for editing certain aspects of the design. In other words, not every stakeholder may have access to design environment 200 or have the wherewithal to understand how the design works unless it is being rendered in a player. Returning to the example of web site design, certain non-technical stakeholders may only have access to, or be proficient in the use of, a web browser while they do not have experience with or access to the more complex design tools used by technical stakeholders for specifying a web site design. As a result, the appearance of the design in either the tool or the viewer may be very different and comments directed to the appearance of the design in the external player might not be relevant to a viewer of the design in the design environment and vice versa. Allowing for the addition of comments in the external viewer allows non-technical stakeholders to conveniently add information to the design process in context which facilitates their review and deploys that information in a manner that is tightly bound to the continuing flow of the design process.

Note 213 is illustrated as having two comments with basic text string inputs. However, comments can, in large part, mirror the content of the notes themselves as described above. For example, the comments can include hyperlinks and text with rich formatting. The comments can also include hyperlinks to a version of the design being rendered in a particular state to which the comment is relevant. The comments can also include image file attachments illustrating a point to which the comment is directed. The image could be of an alternative way for the design to be configured. The comments can also include the "playbacks" mentioned above with reference to the notes that can be used to illustrate a specific rendering of the design.

Notes and comments can be displayed in the external player in various ways. As illustrated in FIG. 2b, the comments can appear directly underneath a note and be collected into one unified graphically distinct unit in the discussion interface 212. Notes can also include an expansion icon that can be selected to alternatively hide or display the comments to the note in order to limit the amount of information that is presented on the screen. The comments can also include an identifier for the viewer that entered the comment, and different text effects or fonts can be applied to distinguish which particular viewer or which class of stakeholder made each comment.

Notes and comments can include various states and status indicators to facilitate management of action items associated with the notes and comments. The notes and comments can be restricted such that they can only be edited by specific stakeholders or a specific class of stakeholders. The notes and comments can also be deleted, and can be restricted so that only a specific stakeholder or a specific class of stakeholders can delete the note or comment. The individual notes and comments can also include selectable icons to indicate that the comment should be closed because it is not currently relevant or has been addressed by the appropriate stakeholder. Access to these icons may be restricted to particular stakeholders and the viewer or user that creates the note can determine which stakeholders should have access to close their particular comment or note. Once closed, the comments could be capable of being reopened if the icon is selected a second time. The restrictions mentioned above can be set on a global basis by a system administrator stakeholder or they can be set by the user or viewer that creates the note or comment. The individual notes and comments could also include selectable icons that would allow stakeholders to apply different statuses to their comments and notes. For example, a stakeholder could click on a pull down menu icon and selected a red flag icon to indicate that the comment or note is urgent. The appearance of the comment or note could change in response to the selection of the comment or notes status. For example, setting the priority of a comment to urgent could change the appearance of the note such that the entire note was outlined in red. As another example, setting the priority of a comment to urgent could change the appearance of the comment so that the comment text appeared highlighted in red. The individual notes and comments could also include selectable icons that would allow stakeholders to determine which class of stakeholders needed to be alerted to the comment. For example, a viewer could select a "security expert" or "graphical designer" class for the comment or note in which case the appearance of the note could change to reflect this such as appearing in blue highlighting if the "security expert" class was selected. Selection of the class of stakeholders or individual stakeholder to which the comment applies could also trigger the delivery of messages to that particular stakeholder or class of stakeholders as described below.

The relationship of notes and widgets can be shown through any kind of visual indicator. As illustrated, the link between note 213 and text field 205 is shown by line 216. However, other indicators can be used such as matching numbered alphanumeric footnotes or a matching reticle surrounding the note and widget simultaneously. Essentially any indicator used to show a link between a note and a widget in the design environment can also show a link between a note and a widget in the external player and vice versa. However, and as shown by the figures, the same type of indicator does not need to be used in both situations. Furthermore, as described below, it is possible to display a single note at a time in which case the relationship of the note and the widget can be illustrated without indicators as the relationship is implied by the common display of both the widget and note at the same time.

The indicators may only appear when certain notes are selected, or the visual indicators may be permanently displayed. For example, the discussion interface 212 could include a scroll bar for moving through the comments and only the notes that were currently displayed on the screen would include visual indicators linking them to widgets in the design. A separate visual indicator such as a highlighted outline around the note could indicate that the widget to which the note applies was not currently being displayed in the rendered design. In these instances, a hyperlink could be automatically added to the note that would link to a rendering in which the widget did appear. A note related to a widget can also appear whenever a viewer hovers their mouse over an icon such as note icon 217. In these situations, only the notes that are associated with the widget to which the note icon is attached will be displayed. This approach is illustrated in FIG. 2c in which note 213 appears as a separate pop up window when a viewer hovers their mouse 218 over note icon 217. Note 213 could also remain in a set location such as within discussion interface 212. In these approaches, the note content of discussion interface 212 would change based on which icon was currently selected or had most previously been selected via a mouse click or hover action. Note icon 217 could be present continuously with rendered design 211 or it could be displayed when the design was switched into a different state in which note icons were rendered along with the design.

Method 300 continues with step 306 in which the design information flow is completed. To this end, a second instantiation of the design is generated for editing in the design environment. The second instantiation can be generated by processing system 401 in FIG. 4. The second instantiation can include a comment added to a note when the design was being rendered in the player. In effect, the note will have been generated in the design tool, commented on in the viewer, and then returned to the design tool.

The ability of the note to flow through the cycle from design environment to player and back produces certain benefits. As mentioned previously, not all stakeholders will have access to, or be proficient in, the use of the design environment so they will only be able to review and comment on the design using a player. However, the comments made by the stakeholders in the player will in large part need to be acted upon by a user in the design environment. The passage of the note and comments back into the design tool therefore creates a more liquid design communication process because the users of the design tool are able to access comments made in the player while they are operating the design tool. Also, the specification of a design is generally an iterative process in which changes are made by users in the design tool and stakeholders suggest modifications on those changes etc. As the comments are able to survive a full cycle of the design tool, they are then able to accompany the design through this iterative process and provide a framework for which the conversation regarding the necessary iterations can be organized and sorted. Stakeholders will be able to track this process in a straight forward manner and recall the motivation for certain changes in the design. This can provide context to the users as they are making the next step of design changes. For example, a user will avoid changing the design to a condition that was previously rejected by other stakeholders which will eliminate unnecessary cycles of the design process.

FIG. 2d displays design environment 200 in which the comments added to note 208 appear in widget specification interface 203. As illustrated, this cycle of the design process has been completed. The user was able to mark the note completed, which in this instance results in the note and comment being displayed in struck out text. As seen in design 201, the user incorporated the design changes requested by the security expert by changing the password text field such that it doesn't display entered text and also incorporated the change requested by the security expert by offsetting the password text box and text field from the rest of the fields. Note 208 could also disappear when marked completed and only be shown if an overarching control such as "Show Completed Notes" was selected in a properties or setting menu.

Instead of marking the note as completed, the user could also have marked the individual comments completed while keeping the note open. The user could then have added an additional comment to the note reminding the security expert and interface expert to check to see if the changes were acceptable. In this way, specific methods that are in accordance with method 300 allow for a flexible and iterative design process that allows stakeholders to continuously stay informed regarding how the design flow is progressing and what their responsibilities are for moving the process forward.

The comments and notes can be stored in a database that is common to both the design environment and the player. In these situations, the comments and notes can appear in real time in the design environment and the player. As a result, viewers and users can be modifying and commenting on the design simultaneously as one stakeholder operates the design tool and the other views the design in a player. In other approaches, notes, comments, and modifications to the design made in the design environment need to be affirmatively pushed by the viewer or user to be added to the common database. In other approaches, the instantiation of the design that is being rendered in an external player is converted back into an encoded a format for being operated on in the design environment. For example, a markup language encoding of an exported design can be converted back into an instantiation in the format used by the design environment along with any comments and notes that have been added to the design since the markup language was initially produced. The converted instantiation can then be saved to a disk and imported back into the design environment. The notes and comments can be included in the markup language encoding of the design or they can be stored separately with an indication of where they are relevant in the design and then be linked back to the design as part of the importing process.

Additional features facilitate the general flow of information between various stakeholders and the interactive design process that is provided by method 300 as described above. The state of the design as a comment or note is added can be saved and attached to the comment or note in various formats. Links in the comments or notes can draw the user or viewer to the point of the design related to the content of the comment or note. Messages regarding the addition of comments or notes to the design can be pushed to various stakeholders by users and viewers and those stakeholders can configure a subscription to the design process by which various changes to the design, comments, and notes can be automatically sent to them.

Whenever a note or comment is added to the design, the current state of the design as it is being specified or rendered can be saved. This saved version of the design or design rendering can then be linked to the comment or note in memory to be recalled at a later time. These states can then be accessed via documents attached to the comments or notes or via links that are placed in the comments or notes. For example, the state could be an image file showing how the design rendering appeared at the time the comment or note was added. The image file could also include additional markings such as with a standard graphical editing tool that a user or viewer is able to open as soon as the comment or note is added to the design. For example, a viewer could add a comment describing how they wanted the design to appear, trigger the graphical editing tool to appear, draw on an image of the design, and then save the edited image so that it is easily accessible to anyone that views the note or comment at a later time. Viewers can also record a portion of their interaction with the design and store the playback with the note or comment as an attachment added to the note or comment or a link added to the note or comment. Users and viewers can also insert links in the notes or comments that link the note to a portion of the design to which the comment relates to. This linking function can also be aided by the design tool. For example, a menu widget may appear in the design tool in various states based on which aspect of the menu widget is being edited. If a user in the viewer adds a note or comment regarding a submenu link that only appears when the menu is in a given state, a link can be added to the note or comment to place the widget in that state in the design tool so that the user can click the link and immediately begin editing that aspect of the widget.

The approaches described in the previous paragraph exhibit various benefits. In particular, the saved states, and easy access thereto provided by attachments and links, allow the comments and notes to remain relevant regardless of how the design changes. As the interactive graphical design goes through various design iterations it may be difficult for subsequent viewers and users to understand what a prior stakeholder was referring to when they added a comment because there comment might no longer be relevant to the current state of the design. However, by including quickly accessible information that describes the state of the design when the comment was made, subsequent viewers and users can more easily put the notes and comments into context and understand the intent of the note or comment. These benefits are particularly relevant to the field of interactive graphical designs because a comment may only be relevant to the design after a number of interactions have been performed and displaying the comments without having put the design in a state that reflects the design after receiving those interactions would not provide context to the user.

Stakeholders may receive messages regarding the addition of comments, notes, or design changes to the design. For example, a stakeholder may receive a daily email describing all of the changes that happened in the previous day. As another example, a stakeholder may receive instant messages regarding changes as they are occurring. The messages can be pushed to particular stakeholders by the stakeholder adding the comment or note. For example, a user may add a note and select a stakeholder identifier from a drop down menu to push a message relating to their note to that stakeholder. The messages could also be subscribed to by particular stakeholders such that a stakeholder could configure which messages they would receive, the content of the messages, and how often the messages would be sent. For example, a security specialist could set their subscription to only send them messages that were flagged by stakeholders as requiring input from a security specialist. As another example, a project management user could set their subscription to send them an SMS message whenever a comment or note was marked urgent, and to route all other messages regarding comments and notes to their personal email.

Numerous features described above can be used to keep track of when and if various users have been read and by who. For example, whether or not a note has been read by a user could be tracked on a per user basis. This could happen explicitly by marking a comment or note read as the user making the mark has been identified by a user. The tracking could also be done implicitly be tracking whether a user has scrolled to a comment or have been expanded. For example, when the comments associated with a note are expanded by a user the system will track all of the comments as having been read by the user that expanded the note comments. This tracking information could also be sent to various stakeholders in the messages described above. In particular, in situations where the user or viewer that creates a note or comment can assign the note or comment to a particular stakeholder or particular class of stakeholders, that user or viewer can receive a message when the comment has been viewed by that stakeholder or class of stakeholders. The messages could include the particular identity of the stakeholder that read the comment. In these situations, only the particular stakeholder or class of stakeholders identified by the user or viewer when they created the note or comment may be able to mark a note or comment as read.

The informational content of the messages can vary. The message could just state that a comment or note was added or could include the entire contents of the note. Those contents may include a link to a rendering of the design or a file that was attached to the note or comment. The messages could identify the design and version in situations where stakeholders were collaborating on multiple designs or multiple versions of the same design. The messages could also identify the identity of the user or viewer that made the note or comment. The messages could also identify the stakeholders that were indicated as being responsible for addressing the note or comment. The message could also include a simple link to a rendering of the design in a player.

The content of the message can change based on the type of comment, note, or design change to which the note is directed. For example, a design change indicating that a version of the design was published or ready for review could trigger an email with a link to a rendering of the design in a player. Emails with links to a rendering of the design could be pushed automatically to all users associated with a project or individual users could be selected as recipients for the email. As another example, notes or comments that are marked with a "HIGH" priority could trigger the delivery of a message with the entire contents of the note or comment; while a note or comment that is marked with a "LOW" priority could trigger the delivery of a message indicating that a low priority comment or note was added.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention.

Figure 4:
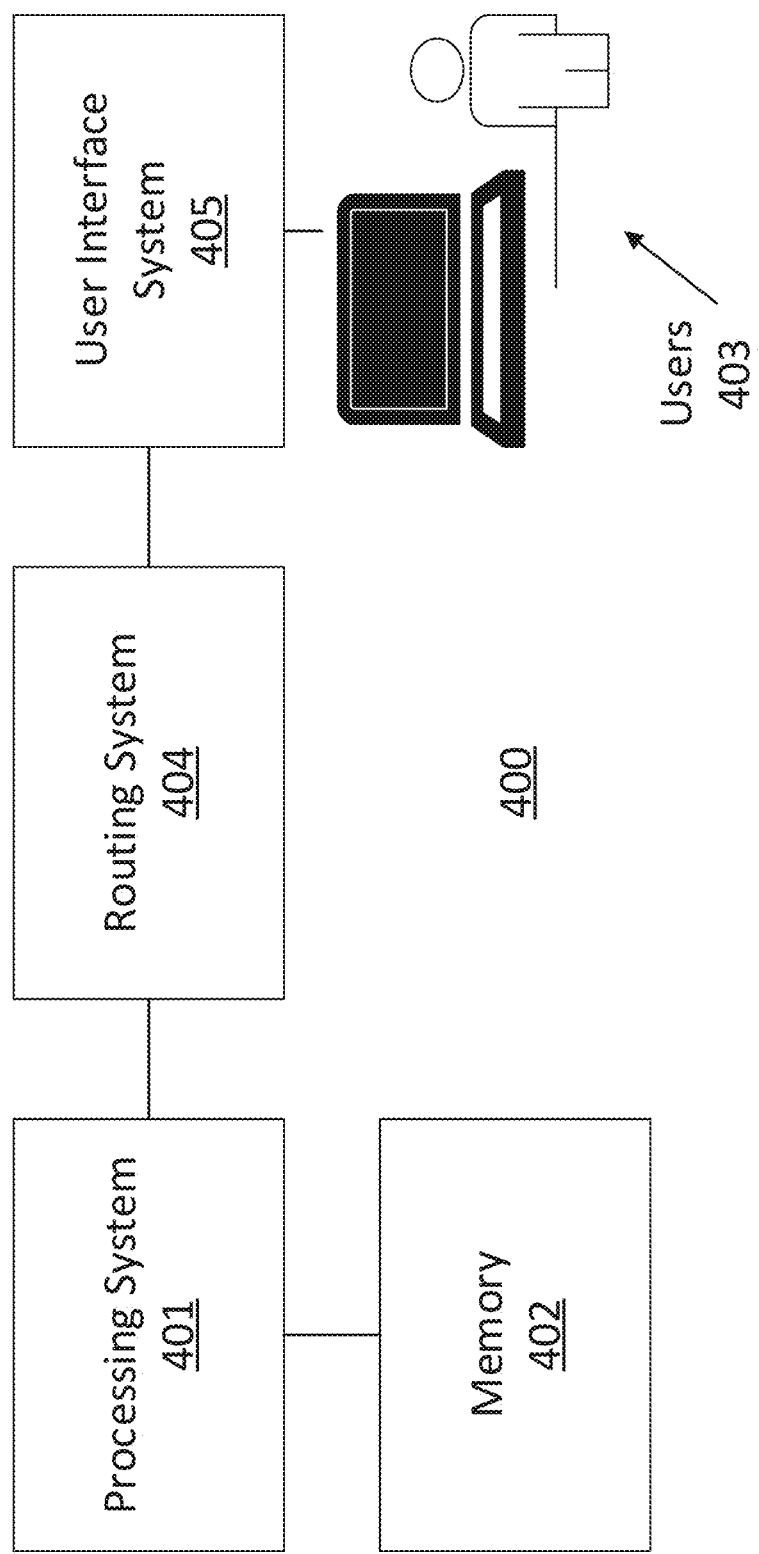
FIG. 4 illustrates a computer system that can be used in combination with the method in FIG. 3.

Any of the methods described herein can be conducted through the use of a computer system 400 as shown in FIG. 4. For example, the design environment could be provided by a processing system 401 acting in tandem with a memory 402. A user 403 would be able to access the design environment through the use of a routing system 404 and a user interface system 405. Any method steps involving providing or accepting things to and from a user can be conducted using interface system 405. Any method steps involving executing an action can be conducted using processing system 401 alone or in combination with memory 402. FIG. 4 is only an illustrative computer system that is amenable to operation in accordance with embodiments of the present invention and variant computer system topologies may be used in its stead. Nothing in this description should limit the processor of processing system 401 to a single processor, as the function of this block can be accomplished by multiple physical processors located either on a single work station or server, or distributed through a network. It is not essential for memory 402 to be physically distinguishable from processing system 401, as they are merely illustrated as separate blocks for purposes of invoking common conceptions of how computing systems operate. Routing system 404 could be the internal routing system of a single work station, a LAN, a WAN, a wired or wireless network, the Internet, or any other system capable of routing signals. User interface system 405 could be a work station, a computer, a mobile phone or other mobile device, or any computing device or group of computing devices capable of receiving inputs from a single user or group of users. FIG. 4 should also not be taken to indicate that the invention can only involve design environments or design programs that may only be accessed by one user as there could be multiple users 403 and that group of multiple users 403 could access the design environment using any number of routing systems 404. Those users could also access the design environment simultaneously.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system comprising:
a first workstation that instantiates a graphical design environment that provides a drag and drop interface to a first user, wherein the drag and drop interface allows a first user to add a widget to a design;
a note interface in the graphical design environment that displays a note field for accepting a text string from the first user;
an intermittent coded representation of the design that: (i) is exported from the design environment; and (ii) includes a set of at least two widgets that includes the widget;
a second workstation that instantiates a first design player that renders the design using the intermittent coded representation for a second user after the design has been exported from the graphical design environment;
a first discussion interface that: (i) is displayed in the first design player consistently with the design; (ii) displays the text string from the first user as a note; and (iii) accepts a first comment from the second user regarding the note;
an interface element that: (i) is in the first discussion interface with the note; and (ii) when selected, places the first design player into a state wherein a selection of the widget by the second user links the note with the widget, wherein the state exposes each widget in the set of at least two widgets for selection by the second user;
a third workstation that instantiates a second design player that renders the design using a copy of the intermittent coded representation for a third user after the design has been exported from the graphical design environment;
a second discussion interface that: (i) is displayed in the second design player consistently with the design; and (ii) accepts a second comment from the third user; and
a data store that is accessible to the graphical design environment and the first design player, and that is not accessible to the second design player;
wherein the first comment is displayed in real time in the graphical design environment after being accepted in the first discussion interface;

wherein the second comment is displayed in the graphical design environment after being accepted in the second discussion interface, saved to disk, and imported into the data store; and wherein the text string and comment are stored in the data store along with an indication of the widget selected by the second user.

2. The system of claim 1, further comprising:

a scrollbar for the first discussion interface;

wherein the scrollbar allows the second user to scroll through a set of notes that are each associated with different portions of the design while viewing a fixed portion of the design; and wherein the set of notes includes the note.

3. The system of claim 1, wherein:

the first and second design players are web browsers;

the design is a web site design; and the second workstation provides a comment field in the first discussion interface for accepting the first comment from the second user.

4. The system of claim 1, further comprising:

a link in the first comment;

wherein selecting the link navigates the first user to a point of the design associated with the first comment.

5. The system of claim 1, further comprising:

a subscription management interface that accepts a subscription type selection from the first user;

wherein the subscription type selection includes a real time or daily delivery option; and wherein the first comment is delivered to the first user via email in accordance with the subscription type selection from the first user.

6. The system of claim 1, further comprising:

a selection reticle displayed by the first design player and surrounding the widget;

wherein the selection reticle is displayed when the note is selected in the first discussion interface.

7. The system of claim 1, wherein the text string is restricted such that it can only be edited by a predetermined set of users.

8. The system of claim 1, further comprising:

an expansion icon displayed in the first discussion interface with the note;

wherein selecting the expansion icon hides and displays a set of comments associated with the note; and the set of comments includes the first comment.

9. The system of claim 1, further comprising:

a selectable icon associated with the first comment;

wherein selecting the selectable icon changes a status of the first comment.

10. The system of claim 1, wherein:

the first discussion interface displays an identifier for the first user with the note.

11. A computer-implemented method comprising:

providing a graphical design environment to a user using a processor, wherein the graphical design environment includes a drag and drop interface that allows the user to add a widget to a design;

displaying a note field in a note interface in the graphical design environment that accepts a text string from the user;

exporting the design from the graphical design environment and storing the design as an intermittent coded representation of the design in a markup language format, wherein a set of at least two widgets that include the widget are exported with the design;

rendering the design in a design player using the intermittent coded representation of the design in the markup language format;

displaying a discussion interface in the design player that: (i) is displayed in the design player consistently with the design; (ii) displays the text string from the user as a note; (iii) has a scrollbar; and (iv) accepts a comment from a second user regarding the note;

allowing the second user to use the scrollbar to scroll through a set of notes that are associated with different portions of the design while viewing a fixed portion of the design;

in response to selection of an interface element that is in the discussion interface with the note by the second user, placing the design player into a state wherein each widget in the set of at least two widgets is exposed for selection by the second user as a selected widget, and wherein selection of the selected widget by the second user links the note with the widget; and displaying the comment in the graphical design environment after being accepted in the discussion interface;

wherein the text string and comment are: (i) stored in a data store along with an indication of the selected widget; (ii) read from the data store and rendered by the design player from the markup language format; and (iii) read from the data store and displayed in the graphical design environment from a design environment format; and wherein the data store is accessible to the graphical design environment and the design player.

12. The computer-implemented method of claim 11, wherein:

a first workstation instantiates the graphical design environment for the providing step;

a second workstation instantiates the design player;

the design player is a web browser;

the design is a web site design; and the second workstation provides a comment field in the discussion interface for accepting the comment from the second user.

13. The computer-implemented method of claim 11, further comprising:

providing a link in the comment; and navigating the user to a point of the design associated with the comment upon selection of the link by the user.

14. The computer-implemented method of claim 11, further comprising:

displaying an expansion icon in the discussion interface with the note;

wherein selecting the expansion icon hides and displays a set of comments associated with the note; and the set of comments includes the comment.

15. The computer-implemented method of claim 11, further comprising:

displaying a selection reticle in the design player that surrounds the widget;

wherein the selection reticle is displayed when the note is selected in the discussion interface.

16. The computer-implemented method of claim 11, further comprising:

displaying the comment in the graphical design environment in real time after the comment is accepted in the discussion interface.

17. The computer-implemented method of claim 11, further comprising:

restricting access to the text string such that it can only be edited by a predetermined set of users.

18. The computer-implemented method of claim 11, further comprising:
providing a subscription type selection option to the user via a subscription management interface, wherein the subscription type selection option includes a real time or daily delivery option; and
delivering the comment to the user via email in accordance with a selected delivery option from the subscription type selection option.

19. The computer-implemented method of claim 11, further comprising:
associating a selectable icon with the comment;
wherein selecting the selectable icon changes a status of the comment.

20. The computer-implemented method of claim 11, further comprising:
displaying an identifier for the user with the note in the discussion interface.

21. Non-transitory computer-readable media storing instructions for executing a computer-implemented method comprising:
providing a graphical design environment to a user using a processor, wherein the graphical design environment includes a drag and drop interface that allows the user to add a widget to a design;
displaying a note field in a note interface in the graphical design environment that accepts a text string from the user;
exporting the design from the graphical design environment and storing the design as an intermittent coded representation of the design in a markup language format, wherein a set of at least two widgets that includes the widget are exported with the design;
rendering the design in a design player using the intermitted coded representation of the design in the markup language format;
displaying a discussion interface in the design player that: (i) is displayed in the design player consistently with the design; (ii) displays the text string from the user as a note; (iii) has a scrollbar; and (iv) accepts a comment from a second user regarding the note;
allowing the second user to use the scrollbar to scroll through a set of notes that are associated with different portions of the design while viewing a fixed portion of the design;
in response to selection of an interface element that is in the discussion interface with the note by the second user, placing the design player into a state wherein each widget in the set of at least two widgets is exposed for selection by the second user as a selected widget, and wherein selection of the selected widget by the second user links the note with the widget; and
displaying the comment in the graphical design environment after being accepted in the discussion interface;
wherein the text string and comment are: (i) stored in a data store along with an indication of the selected widget; (ii) read from the data store and rendered by the design player from the markup language format; and (iii) read from the data store and displayed in the graphical design environment from a design environment format; and
wherein the data store is accessible to the graphical design environment and the design player.

22. The non-transitory computer-readable media of claim 21, wherein:
a first workstation instantiates the graphical design environment for the providing step using a first portion of the computer-readable media;
a second workstation instantiates the design player using a second portion of the computer-readable media;
the design player is a web browser;
the design is a web site design; and
the second workstation provides a comment field in the discussion interface for accepting the comment from the second user.

23. The non-transitory computer-readable media of claim 21, wherein the method further comprises:
receiving a selection of a link in the comment from the user; and
focusing a display of the design on a point of the design associated with the comment after receiving the selection of the link in the comment from the user.

24. The non-transitory computer-readable media of claim 21, wherein the method further comprises:
displaying an expansion icon in the discussion interface with the note;
wherein selecting the expansion icon hides and displays a set of comments associated with the note; and
the set of comments includes the comment.

25. The non-transitory computer-readable media of claim 21, wherein the method further comprises:
displaying a selection reticle in the design player that surrounds the widget;
wherein the selection reticle is displayed when the note is selected in the discussion interface.

26. The non-transitory computer-readable media of claim 21, wherein the method further comprises:
displaying the comment in the graphical design environment in real time after the comment is accepted in the discussion interface.

27. The non-transitory computer-readable media of claim 21, wherein the method further comprises:
restricting access to the text string such that it can only be edited by a predetermined set of users.

28. The non-transitory computer-readable media of claim 21, wherein the method further comprises:
receiving a subscription type selection option from the user to switch a comment subscription frequency between daily and real time;
receiving a second text string from the second user via the design player, wherein the second text string is stored as a second comment on the note in the data store; and
delivering the second comment to the user via email in real time after the second comment is received in the design player in the second text string receiving step.

29. The non-transitory computer-readable media of claim 21, wherein the method further comprises:
associating a selectable icon with the comment;
wherein selecting the selectable icon changes a status of the comment.

30. The non-transitory computer-readable media of claim 21, wherein the method further comprises:
displaying an identifier for the user with the note in the discussion interface.

* * * * *